United States Patent
Kawakami et al.

(10) Patent No.: US 7,262,525 B2
(45) Date of Patent: Aug. 28, 2007

(54) ROTOR AND MOTOR HAVING THE SAME

(75) Inventors: Takenobu Kawakami, Toyohashi (JP); Kazunobu Kanno, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 494 days.

(21) Appl. No.: 10/878,370

(22) Filed: Jun. 29, 2004

(65) Prior Publication Data

US 2005/0012407 A1    Jan. 20, 2005

(30) Foreign Application Priority Data

Jul. 16, 2003  (JP)  ............... 2003-275604
Oct. 30, 2003  (JP)  ............... 2003-371078

(51) Int. Cl.
*H02K 33/00* (2006.01)
(52) U.S. Cl. .......................... 310/20; 310/80
(58) Field of Classification Search ................ 310/20, 310/43, 80, 90, 68 B; 180/444; 29/596
See application file for complete search history.

(56) References Cited

U.S. PATENT DOCUMENTS 2,269,651 A * 1/1942  Crocker ................ 310/156.09
4,484,094 A * 11/1984 Ade et al. .................... 310/43
4,973,872 A * 11/1990 Dohogne ................ 310/156.28
5,738,181 A * 4/1998  Kato ......................... 180/400
5,921,344 A * 7/1999  Boyer ....................... 180/444

FOREIGN PATENT DOCUMENTS

JP    A-2002-234449    8/2002

* cited by examiner

*Primary Examiner*—Dang Le
*Assistant Examiner*—Nguyen Hanh
(74) *Attorney, Agent, or Firm*—Posz Law Group, PLC (57) ABSTRACT

A rotor of a motor includes a cylindrical rotor shaft that is formed through plastic working. The shaft includes a positioning portion that is formed in an inner peripheral surface of the cylindrical shaft by the plastic working of the shaft. The positioning portion is detachably engageable with a securing member, which is insertable into the shaft in an axial direction of the shaft to position the shaft in a circumferential direction. When the positioning portion is engaged with the securing member, relative rotation between the shaft and the securing member is limited.

19 Claims, 9 Drawing Sheets

ROTOR AND MOTOR HAVING THE SAME

CROSS REFERENCE TO RELATED APPLICATION

This application is based on and incorporates herein by reference Japanese Patent Application No. 2003-275604 filed on Jul. 16, 2003 and Japanese Patent Application No. 2003-371078 filed on Oct. 30, 2003.

BACKGROUND OF THE INVENTION

1. Field of the Invention

The present invention relates to a rotor and a motor having the same.

2. Description of Related Art

Figure 10:
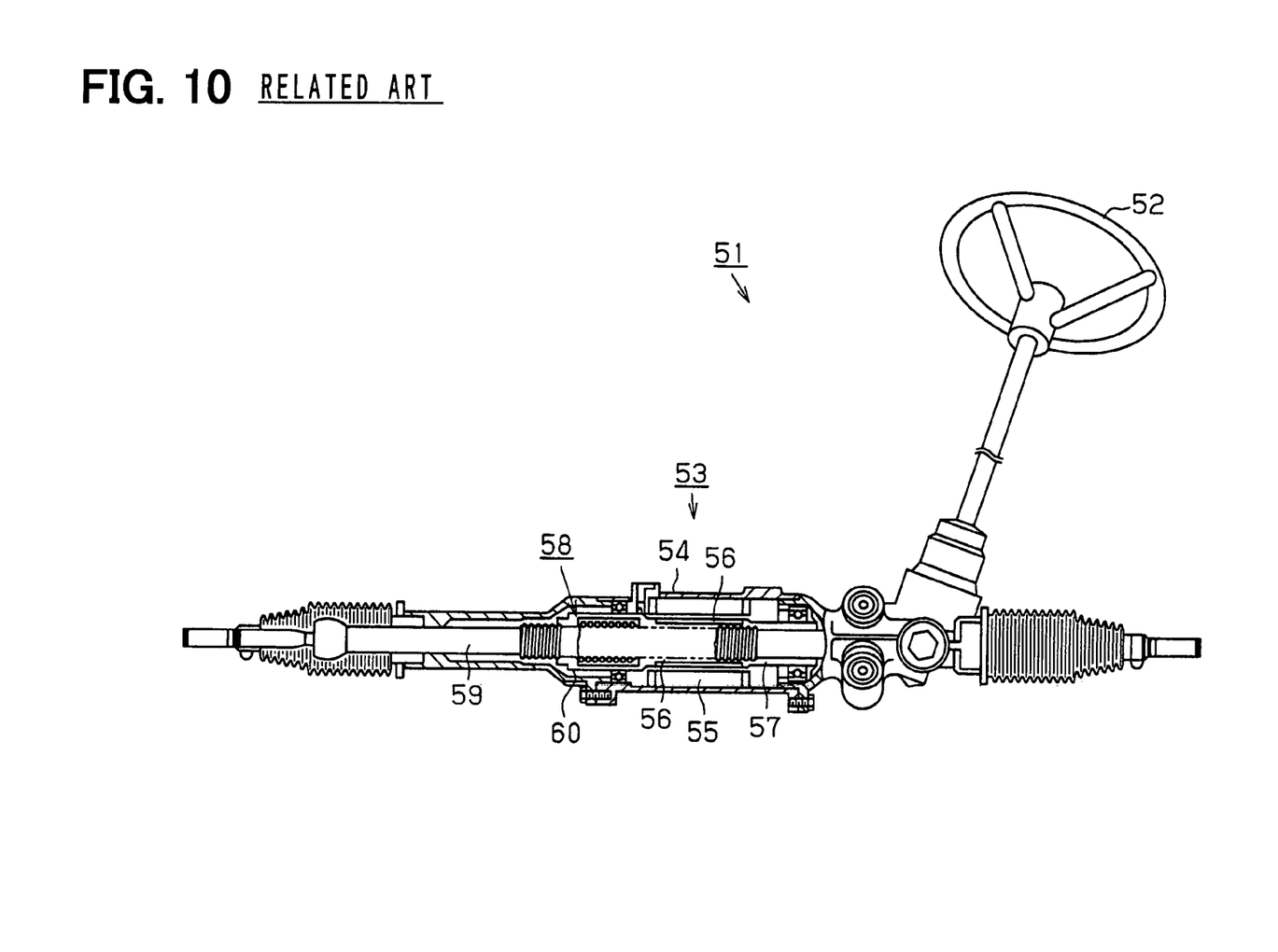
FIG. 10 is a schematic cross sectional view of a previously proposed power steering system.

As disclosed in Japanese Unexamined Patent Publication No. 2002-234449, a rotor of a brushless motor, which is used in a power steering system, includes a cylindrical shaft. One such cylindrical shaft is shown in FIG. 10. As shown in FIG. 10, a stator 55 is secured to an inner peripheral surface of a housing 54 of a brushless motor 53 of a power steering system 51. A rotor 57 is rotatably received at radially inward of the stator 55 in such a manner that the rotor 57 is radially spaced a predetermined distance from the stator 55. Magnets 56 are installed to an outer peripheral surface of the rotor 57. Wheels (not shown) are connected to axial ends, respectively, of a rack shaft 59. Rotation of the rotor 57 causes reciprocal movement of the rack shaft 59 through a ball screw mechanism 58. In this way, a steering force of a steering wheel 52 is assisted by the brushless motor 53.

Figure 11A:
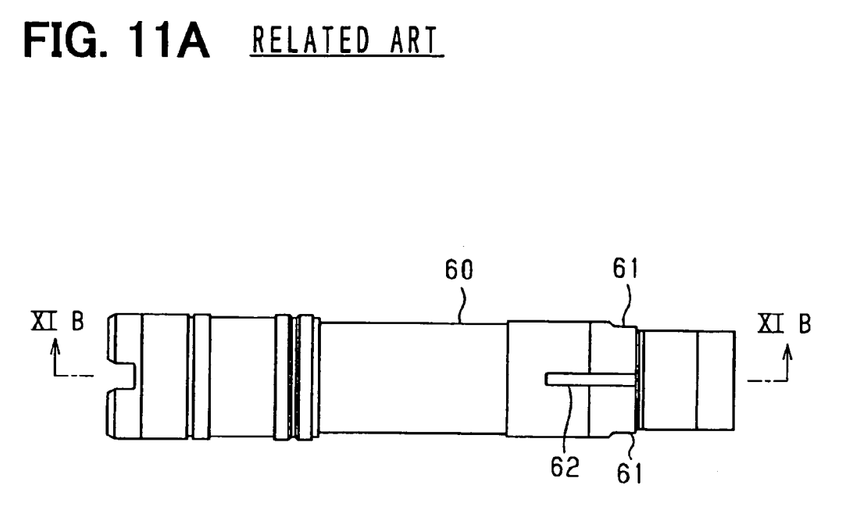
FIG. 11A is a side view of a cylindrical shaft of the previously proposed power steering system.
Figure 11B:
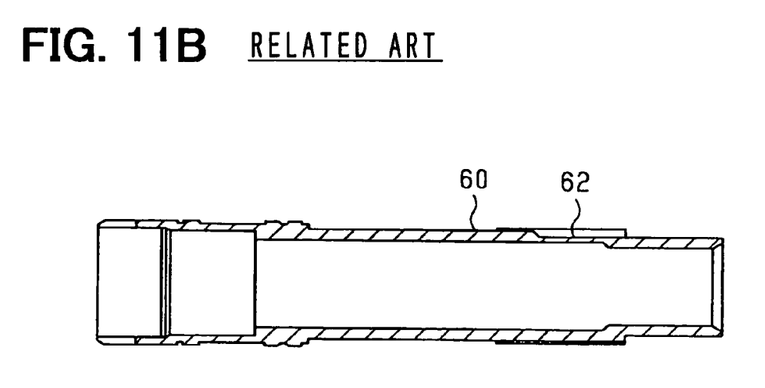
FIG. 11B is a cross sectional view taken along line XIB-XIB in FIG. 11A.

The rack shaft 59 is inserted through the rotor 57. As shown in FIG. 11A, a double sided portion (a positioning portion) 61, which includes two diametrically opposed flat sides, is formed at one end of a cylindrical shaft (a rotor shaft) 60 of the rotor 57. As shown in FIGS. 11A and 11B, a key groove 62 is formed in an outer peripheral surface of the cylindrical shaft 60. The double sided portion 61 is formed to prevent, for example, rotation of the cylindrical shaft 60 at the time of installing a nut into the other end of the cylindrical shaft 60. More specifically, the double sided portion 61 is held by an assembly device to position and secure the cylindrical shaft 60. The key groove 62 is formed to position a sensor or the like, which is installed to the cylindrical shaft 60.

In the case of the above cylindrical shaft 60, after formation of the cylindrical shaft 60, additional manufacturing steps for forming the double sided portion 61 and the key groove 62 are required. This causes an increase in the number of manufacturing steps, thereby resulting in an increase in the manufacturing costs. Furthermore, at the time of installing the sensor or the like to the cylindrical shaft 60, the key groove 62 needs to be detected in the circumferential direction in the surface of the cylindrical shaft 60 to position the sensor or the like relative to the key groove 62, resulting in a low work efficiency.

SUMMARY OF THE INVENTION

The present invention addresses the above disadvantages. Thus, it is an objective of the present invention to provide a rotor, which can minimize the manufacturing costs and can improve work efficiency at the time of assembling the rotor. It is another objective of the present invention to provide a motor having such a rotor.

To achieve the objectives of the present invention, there is provided a rotor, which includes a cylindrical shaft that is formed through plastic working. The cylindrical shaft includes a positioning portion that is formed in an inner peripheral surface of the cylindrical shaft by the plastic working of the cylindrical shaft. The positioning portion is detachably engageable with an external engaging means, which is insertable into the cylindrical shaft in an axial direction of the cylindrical shaft to position the cylindrical shaft in a circumferential direction. When the positioning portion is engaged with the external engaging means, relative rotation between the cylindrical shaft and the external engaging means is limited.

To achieve the objectives of the present invention, there is also provide a motor having such a rotor.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to FIGS. 1-8.

Figure 1:
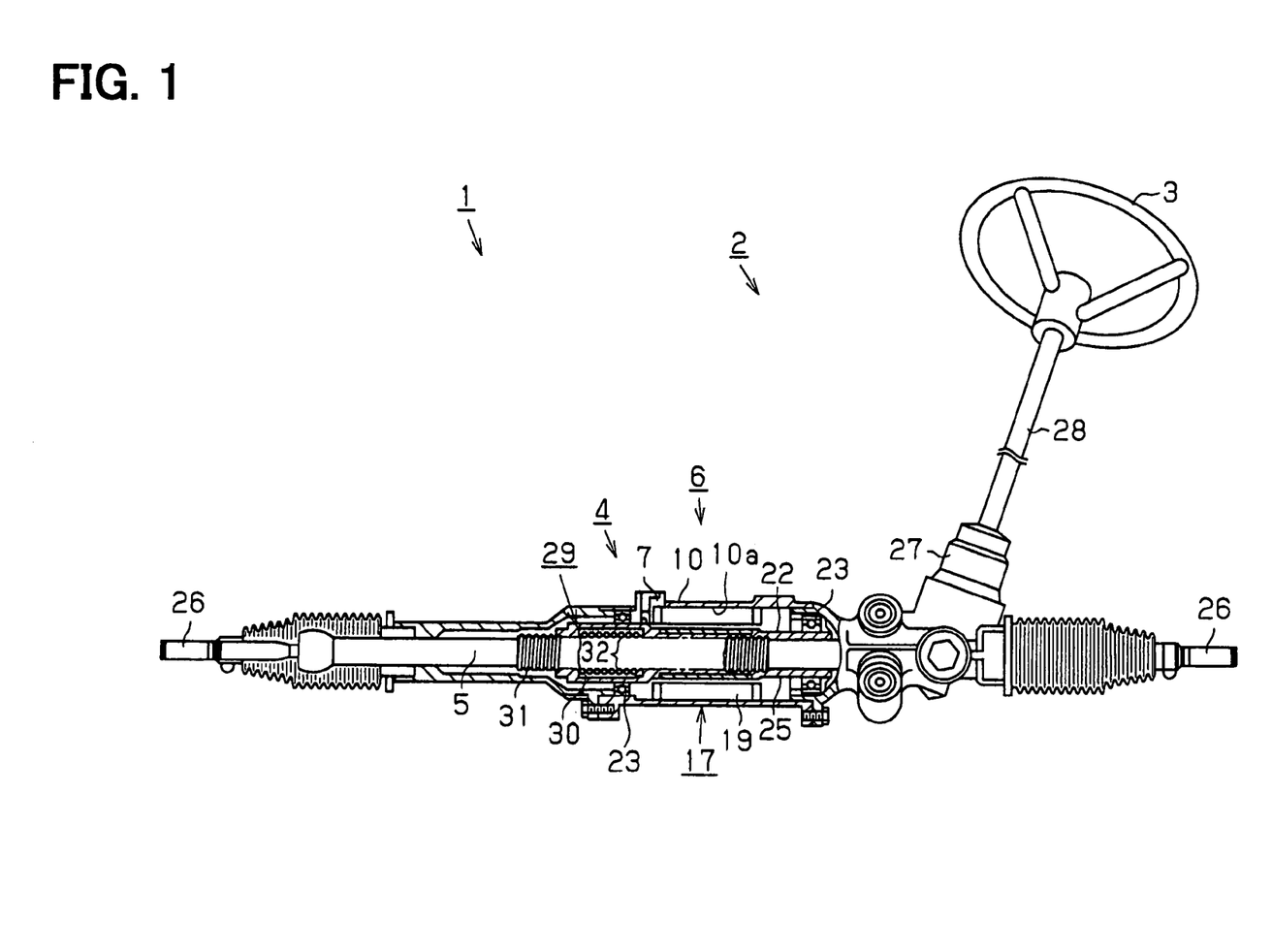
FIG. 1 is a schematic cross sectional view of a power steering system according to an embodiment of the present invention.

As shown in FIG. 1, a power steering system 1 is installed in a rack and pinion type steering apparatus 2 to assist a steering force of a steering wheel 3 of a vehicle. The power steering system 1 includes a power supply device 4, a steering rack 5 and brushless motor 6. The brushless motor 6 serves as a motor of the present invention.

Figure 2:
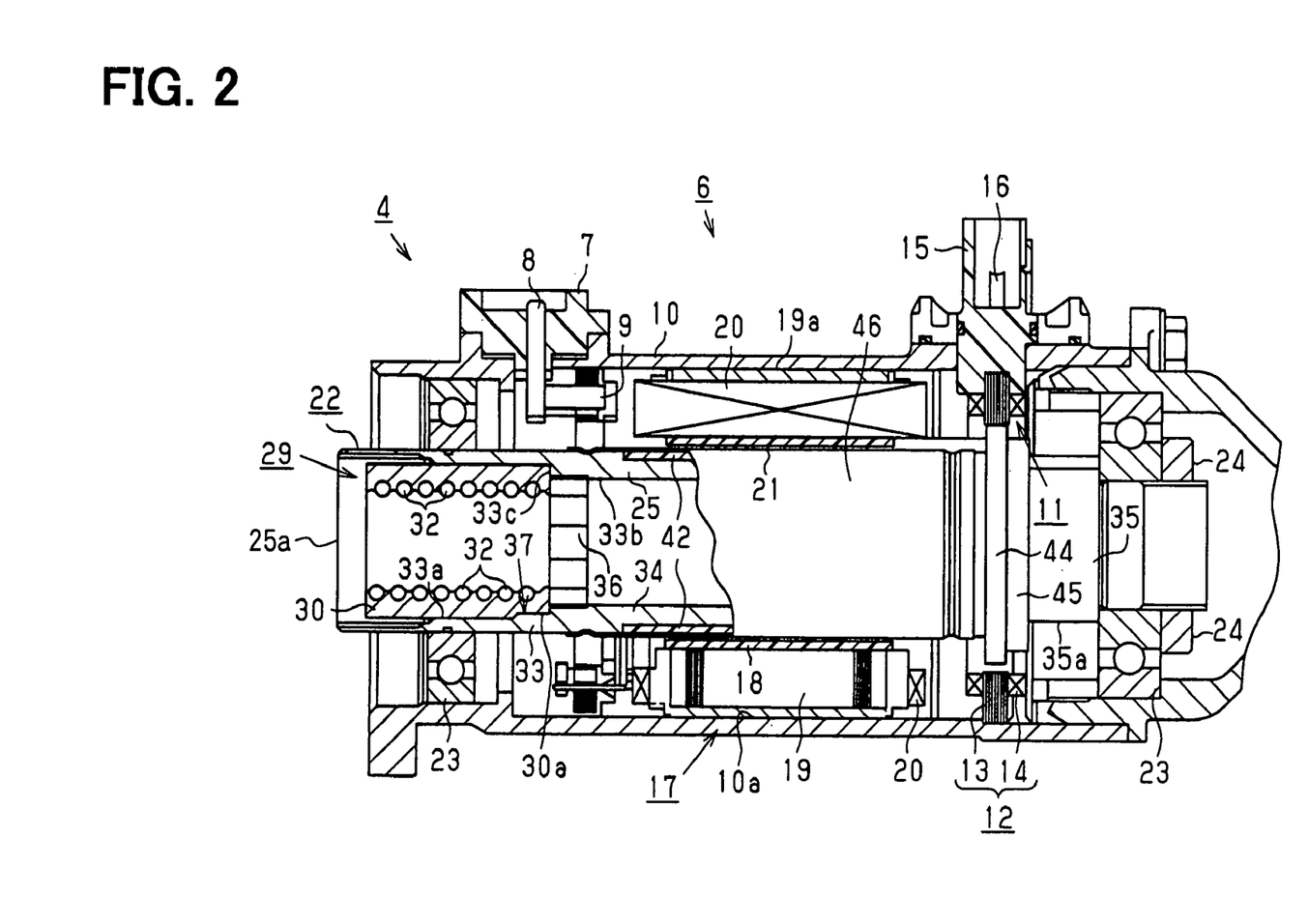
FIG. 2 is an enlarged partial view of the power steering system.

As shown in FIG. 2, the power supply device 4 includes a coupler 7, a terminal 8 and a bus bar 9.

The coupler 7 is formed to be connectable with a power supply connector (not shown). The coupler 7 has the terminal 8, which is connectable with the connector (not shown). A distal end of the terminal 8 is electrically connected to the bus bar 9, which is, in turn, electrically connected to the brushless motor 6. That is, the power supply device 4 is for supplying electric power to the brushless motor 6.

A housing 10 of the brushless motor 6 is formed into a generally cylindrical shape. A resolver stator 12, which forms a part of a resolver 11, is connected to the housing 10. The resolver stator 12 includes a generally cylindrical core 13 and coils 14. The coils 14 are wound around the core 13. The core 13 is formed by stacking a plurality of core sheets, each of which is formed by punching a corresponding metal plate material through press working.

A resolver connector 15, which outputs a measured signal from the resolver 11, is installed to the housing 10. The resolver connector 15 includes a terminal 16, which is electrically connected to the coils 14 of the resolver stator 12. An external connector (not shown) is installed to the resolver connector 15.

A generally cylindrical stator 17 is secured to an inner peripheral surface 10a of the housing 10. The stator 17 includes an insulator 18, a core 19 and coils 20. The coils 20 are wound around the core 19.

The insulator 18 is made of a synthetic resin and is installed to the core 19 to electrically insulate between the coils 20 and the core 19.

The core 19 is formed by stacking a plurality of core sheets (not shown), each of which is formed by punching a corresponding magnetic metal plate material through press working. An outer peripheral surface 19a of the core 19 is engaged entirely with the inner peripheral surface 10a of the housing 10. A rotor receiving hole 21 is defined by an inner peripheral part of the core 19.

A rotor 22 is rotatably received at radially inward of the stator 17 (i.e., in the rotor receiving hole 21). The rotor 22 is rotatably received at radially inward of the stator 17 in such a manner that the rotor 22 is radially spaced a predetermined distance from the stator 17. The rotor 22 is formed into a cylindrical shape and is rotatably supported relative to the stator 17 through two bearings 23, which are provided at axial ends, respectively, of the housing 10. A nut 24 is secured to the rotor shaft 25 at a steering device 2 side end (a right side end in FIG. 2) of the bearing 23.

As shown in FIG. 1, the steering rack 5 is inserted through a rotor shaft 25, which serves as a cylindrical shaft of the present invention that forms a part of the rotor 22. The steering rack 5 is non-rotatably supported, and the steering rack 5 is reciprocable in the axial direction (the left-right direction in FIG. 1). Each of axial ends of the steering rack 5 is connected to a corresponding wheel (not shown) through a corresponding tie rod 26. An output shaft of a torque sensor unit 27 is connected to the steering rack 5 through a rack gear (not shown) and a pinion gear (not shown).

The torque sensor unit 27 is for measuring a rotational torque of a steering shaft 28, which forms a part of the steering device 2. The steering shaft 28 is for conducting the steering force of the steering wheel 3 to the steering rack 5. The rotor 22 is connected to the steering rack 5 through a ball screw mechanism 29, which is integrated with the brushless motor 6.

As shown in FIG. 2, the ball screw mechanism 29 includes a nut 30, a screw 31 (FIG. 1) and a plurality of balls 32. The nut 30 serves as an insert member of the present invention.

The nut 30 is fitted to an inner peripheral surface of the rotor shaft 25. The screw 31 is threaded in an outer peripheral surface of the steering rack 5. Each ball 32 is radially interposed between the nut 30 and the screw 31. When the steering rack 5 is reciprocated through the rotation of the brushless motor 6 through the ball screw mechanism 29, the steering force of the steering wheel 3 is assisted.

Figure 3:
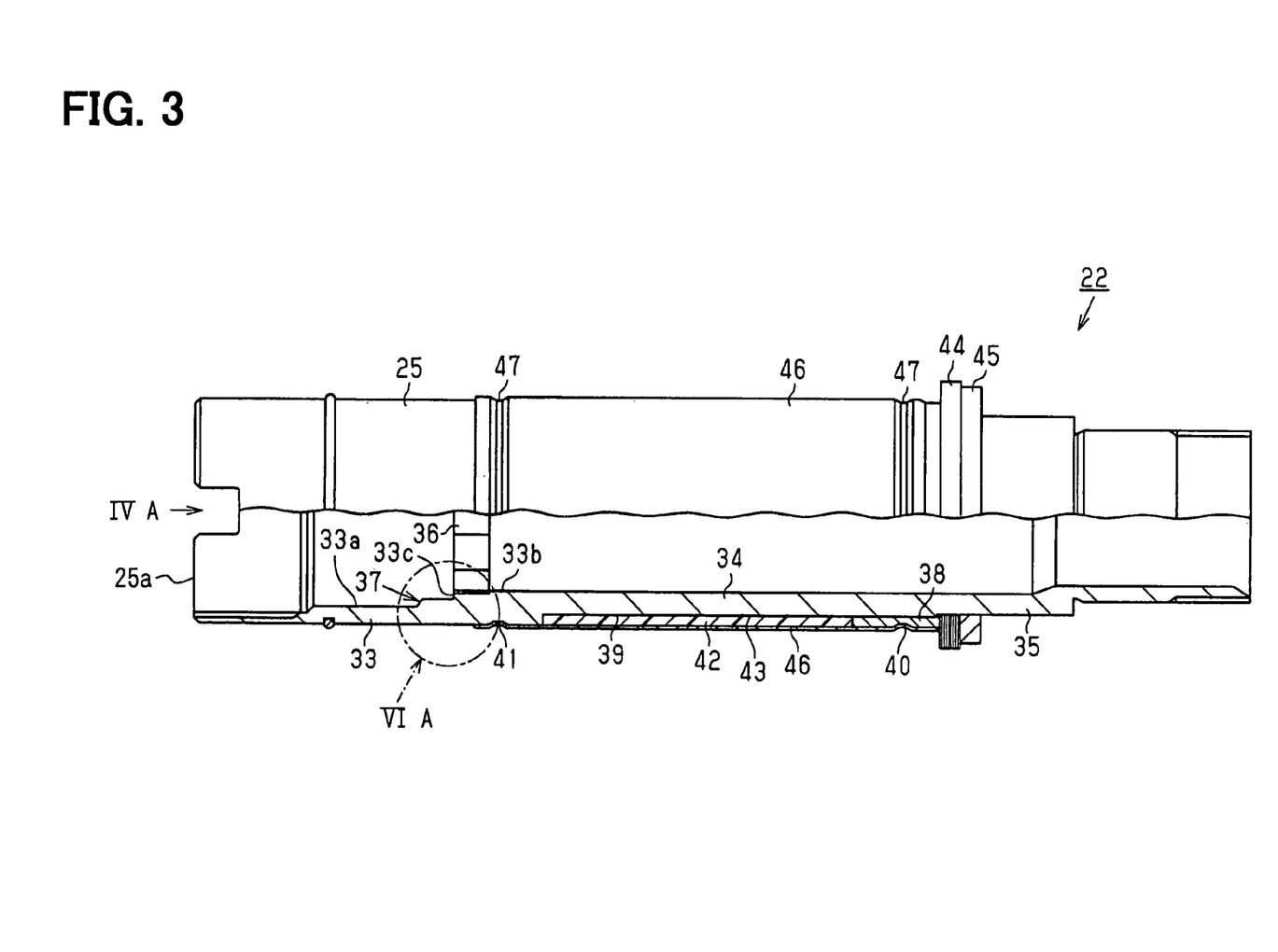
FIG. 3 is a partially fragmented view of a rotor of a motor of the power steering system.

As shown in FIG. 3, the rotor shaft 25, which forms the part of the rotor 22, is formed into a cylindrical shape and is made of an iron material. The rotor shaft 25 includes a stepped portion 33, an inserting portion 34 and a resolver securing portion 35, which are arranged in this order in the axial direction from the ball screw mechanism 29 side end of the rotor shaft 25. The inserting portion 34 is inserted into the rotor receiving hole 21. A resolver rotor 44 is installed to the resolver securing portion 35. A positioning portion 36 is formed in an inserting portion 34 side end of the stepped portion 33. Furthermore, a protrusion 37 is formed on one axial side of the positioning portion 36 opposite from the resolver securing portion 35.

The stepped portion 33 includes a large diameter part 33a and a small diameter part 33b, which are arranged in this order from an end opening 25a side (the left side in FIG. 3) of the rotor shaft 25. A stop surface 33c radially extends at a boundary between the large diameter part 33a and the small diameter part 33b. An inner diameter of the large diameter part 33a is generally the same as an outer diameter of the nut 30 of the ball screw mechanism 29. The nut 30 is installed to the large diameter part 33a from the end opening 25a of the rotor shaft 25 and is stopped by the stop surface 33c in the axial direction (FIG. 2). At this time, a recess 30a, which is formed in the nut 30, is engaged with the protrusion 37. An inner diameter of the small diameter part 33b is the same as an inner diameter of the inserting portion 34. An inner peripheral surface of the small diameter part 33b is formed continuously with, i.e., is flush with an inner peripheral surface of the inserting portion 34. An outer diameter of the stepped portion 33 is slightly larger than an outer diameter of the inserting portion 34.

Figure 4A:
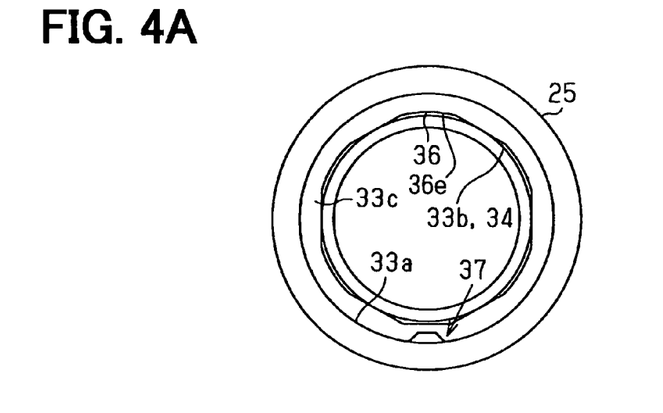
FIG. 4A is an end view of the rotor seen in a direction of arrow IVA in FIG. 3.

The positioning portion 36 is formed to extend from the stop surface 33c toward an inserting portion 34 side, i.e., to extend from the stop surface 33c away from the nut 30 in the axial direction of the rotor shaft 25. Furthermore, the positioning portion 36 defines a receiving hole 36e (FIG. 4A) therein. FIG. 4A shows an end view, which is seen from a stepped portion 33 side. As shown in FIG. 4A, a cross section of the receiving hole 36e of the positioning portion 36 has an irregular heptagonal shape (an asymmetrically shaped cross section).

The positioning portion 36 will be described with reference to FIG. 4B.

Figure 4B:
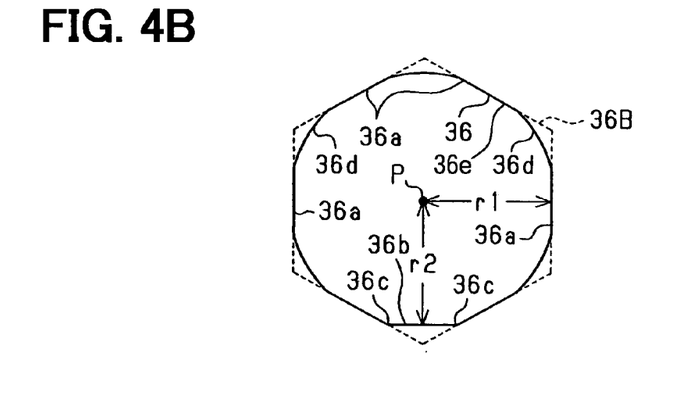
FIG. 4B is a schematic view showing a cross section of a receiving hole of a positioning portion of a rotor shaft of the rotor.

As shown in FIG. 4B, the cross section of the receiving hole 36e of the positioning portion 36 has the irregular heptagonal shape, which is formed by modifying a regular hexagon 36B (indicated by a dotted line in FIG. 4B) that has a center in a center axis P of the rotor shaft 25. Here, one corner (the corner located in the lower end in FIG. 4B) of the regular hexagon 36B is made flat. Thus, in addition to six linear parts 36a of the regular hexagon 36B, a linear part 36b is formed. Two corners 36c are arranged at ends of the linear part 36b. A distance r1 between the center axis P and the linear part 36a is greater than a distance r2 between the center axis P and the linear part 36b.

An arcuate part 36d is formed between corresponding two of the linear parts 36a of the regular hexagon 36B. A distance between the center axis P and the arcuate part 36d is constant. More specifically, each arcuate part 36d extends along a corresponding imaginary arc that has a predetermined radius of curvature. Thus, each arcuate part 36d is formed in a corresponding thin wall portion of the rotor shaft 25.

Figure 5:
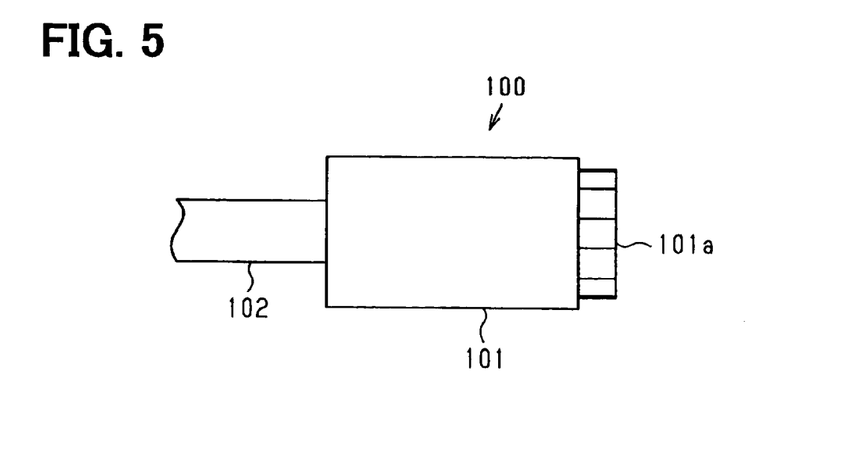
FIG. 5 is a partial side view of a securing member according to the embodiment.

A securing member 100, which serves as an external engaging means of the present invention, will be described.

The securing member 100 is for positioning and securing the rotor shaft 25 in the circumferential direction. The securing member 100 is detachably installed relative to the rotor shaft 25 at the time of assembling the rotor 22. The securing member 100 includes an engaging portion 101, which is supported by a supporting portion 102. A fitting portion 101a is provided in a distal end of the engaging portion 101 and is received in the receiving hole 36e of the positioning portion 36 at the time of assembling the rotor 22. The engaging portion 101 has a diameter slightly smaller than that of the large diameter part 33a of the stepped portion 33. A cross sectional shape of the fitting portion 101a generally coincides with that of the receiving hole 36e of the positioning portion 36. More specifically, in the present embodiment, as shown in FIGS. 4A and 4B, the fitting portion 101a is formed such that the cross section of the fitting portion 101a has an irregular heptagonal shape, which generally coincides with the irregular heptagonal shape of the receiving hole 36e.

When the securing member 100 is inserted into the rotor shaft 25 through the end opening 25a of the rotor shaft 25, the fitting portion 101a is fitted into the receiving hole 36e of the positioning portion 36. Then, a distal end surface of the fitting portion 101a is engaged with and is stopped by an inserting portion 34 side end surface of the positioning portion 36, so that further axial movement of the fitting portion 101a is limited. In this state, when the support portion 102 is secured, the rotor shaft 25 cannot be rotated in a circumferential direction, so that the rotor shaft 25 is positioned and is secured in the circumferential direction.

More specifically, as shown in FIG. 4B, the distance r1 between the center axis P and the linear part 36a is different from the distance r2 between the center axis P and the linear part 36b (i.e., the distance r1>the distance r2). The cross section of the receiving hole 36e of the positioning portion 36 is shaped such that only one of the corners of the regular hexagon 36B is made flat to form the linear part 36b. Thus, the positioning of the fitting portion 101a of the securing member 100 relative to the positioning portion 36 in the circumferential direction is made possible by the linear part 36b. That is, the fitting portion 101a of the securing member 100 cannot be inserted into the receiving hole 36e of the positioning portion 36 unless the fitting portion 101a of the securing member 100 is correctly oriented relative to the positioning portion 36.

Figure 6A:
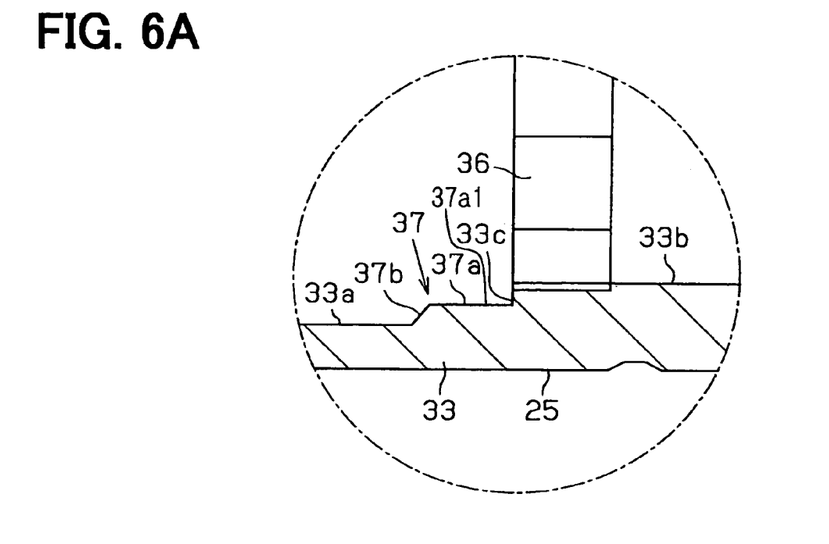
FIG. 6A is a partial enlarged view of a circled region indicated by an arrow VIA in FIG. 3 without a cover of the rotor.
Figure 6B:
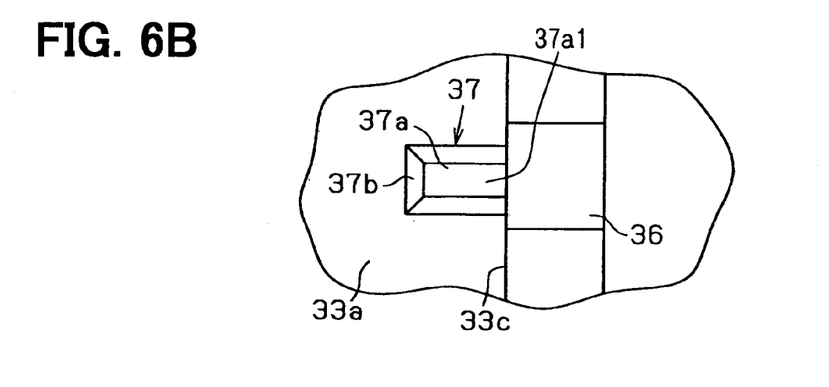
FIG. 6B is a partial plan view of the rotor of FIG. 6A.
Figure 6C:
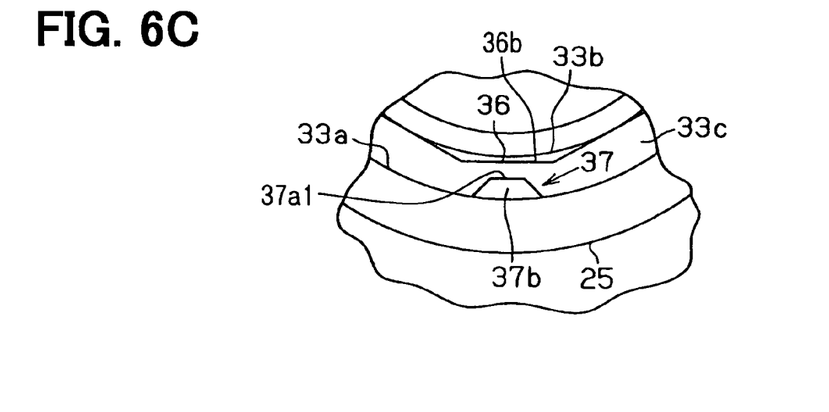
FIG. 6C is a partial end view of the rotor of FIG. 6A or 6B.

Furthermore, the protrusion 37 extends from the stop surface 33c on the side opposite from the inserting portion 34, i.e., on the side where the nut 30 is installed. In other words, the protrusion 37 axially extends from the stop surface 33c toward the nut 30. As shown in FIGS. 6A-6C, the protrusion 37 includes a trapezoidal section 37a and a chamfered section 37b. The trapezoidal section 37a serves as a highest part of the protrusion 37 and has a generally trapezoidal shape. The chamfered section 37b is formed in an axial end of the trapezoidal section 37a.

The trapezoidal section 37a has the generally trapezoidal shape when the trapezoidal section 37a is seen in the axial direction. The trapezoidal section 37a is formed to achieve a constant inner radial size between the center axis P of the rotor shaft 25 and the trapezoidal section 37a along the length of the trapezoidal section 37a in the axial direction. More specifically, a top surface 37a1 of the trapezoidal section 37a, which serves as a radially innermost top surface of the protrusion 37 (i.e., a radially innermost point of the protrusion 37), extends parallel to the axial direction of the rotor shaft 25. The inner radial size between the center axis P of the rotor shaft 25 and the trapezoidal section 37a is greater than the distance r2 (FIGS. 4A and 4B), which is the inner radial size between the center axis P of the rotor shaft 25 and the linear portion 36b that is opposed to the protrusion 37 in the axial direction of the rotor shaft 25. The chamfered section 37b is formed such that an inner radial size between the center axis P of the rotor shaft 25 and the chamfered section 37b progressively decreases toward the positioning portion 36. In other words, the chamfered section 37b is tapered away from the stop surface 33c in the axial direction of the rotor shaft 25. The recess 30a of the nut 37 is fitted to the protrusion 37.

As shown in FIG. 3, an intervening member 38, which has a generally cylindrical shape, is fitted to an outer peripheral surface of the inserting portion 34. The intervening member 38 is axially positioned between a magnet arrangement 42 and the resolver rotor 44. The intervening member 38 is for preventing removal of the magnet arrangement 42 from the inserting portion 34. The intervening member 38 is made of an iron material, which is the same magnetic material as that of the rotor shaft 25. An outer diameter of the intervening member 38 is generally the same as the outer diameter of the stepped portion 33. An inner diameter of the intervening member 38 is generally the same as the outer diameter of the inserting portion 34. Thus, a receiving groove 39 is formed in the outer peripheral surface of the inserting portion 34.

The outer diameter of the stepped portion 33 is greater than the outer diameter of the inserting portion 34, and the outer diameter of the inserting portion 34 is slightly smaller than an inner diameter of the rotor receiving hole 21. An outer diameter of the resolver securing portion 35 is slightly smaller than the outer diameter of the inserting portion 34. An engaging recess 40, which has an arcuate cross section, is formed in an outer peripheral surface of the intervening member 38. The engaging recess 40 extends in a circumferential direction of the intervening member 38. An engaging recess 41, which has an arcuate cross section, is formed in an outer peripheral surface of the stepped portion 33. The engaging recess 41 extends in the circumferential direction of the rotor shaft 25. An axial width and a radial depth of the engaging recess 41 are set to be generally the same as an axial width and a radial depth of the engaging recess 40.

The receiving groove 39 is present between the engaging recess 40 and the engaging recess 41 in the axial direction of the rotor shaft 25 and is positioned in the axial direction of the rotor shaft 25 in such a manner that the receiving groove 39 is radially opposed to an inner peripheral surface of the core 19 (an inner surface of the rotor receiving hole 21) of FIG. 2. The receiving groove 39 extends in the circumferential direction of the rotor shaft 25 and has a rectangular cross section. An extent of the receiving groove 39 in the axial direction of the rotor shaft 25 is greater than that of the engaging recess 40 or of the engaging recess 41. Furthermore, a radial depth of the receiving groove 39 is greater than that of the engaging recess 40 or of the engaging recess 41.

The magnet arrangement 42, which has a generally cylindrical shape, is received in the receiving groove 39. The magnet arrangement 42 is formed by alternately arranging a plurality of magnets, which have different polarities, in the circumferential direction. In the present embodiment, an Nd—Fe—B sintered magnet (a neodimium magnet) is used for the magnet arrangement 42.

In FIG. 3, an outer peripheral surface of the magnet arrangement 42 projects from an opening of the receiving groove 39. An inner peripheral surface of the magnet arrangement 42 is spaced from an outer peripheral surface of the receiving groove 39. One end surface of the magnet arrangement 42, which is located on a stepped portion 33 side of the magnet arrangement 42, is spaced from an opposed end surface of the receiving groove 39 in the axial direction of the rotor shaft 25. Furthermore, the other end surface of the magnet arrangement 42, which is located on a resolver securing portion 35 side of the magnet arrangement 42, is spaced from an opposed end surface of the intervening member 38 in the axial direction of the rotor shaft 25. That is, a radial space is provided between the magnet arrangement 42 and the rotor shaft 25 (the receiving groove 39) in the radial direction, and an axial space is provided between the magnet arrangement 42 and the receiving groove 39 in the axial direction. The magnet arrangement 42 is secured to the receiving groove 39 by adhesive 43. The adhesive 43 is applied to the inner peripheral surface of the magnet arrangement 42 or to the outer peripheral surface of the receiving groove 39 of the rotor shaft 25, and then the magnet arrangement 42 is inserted in the receiving groove 39. The adhesive 43 can be resilinet silicone adhesive or urethane adhesive.

As shown in FIG. 2, the resolver rotor 44, which forms a part of the resolver 11, is fitted to the outer peripheral surface 35a of the resolver securing portion 35. The resolver rotor 44 is formed by stacking a plurality of core sheets, each of which is made by punching a corresponding metal plate material through press working. The resolver rotor 44 and the resolver stator 12 form the resolver 11 of a variable reluctance type, which measures a rotational position of the rotor 22 of the brushless motor 6.

A stopper 45 is fitted to the outer peripheral surface 35a (FIG. 2) of the resolver securing portion 35. The stopper 45 is formed into a generally cylindrical shape and prevents removal of the resolver rotor 44 from the resolver securing portion 35. An outer diameter of the stopper 45 is smaller than an outer diameter of the resolver rotor 44.

As shown in FIG. 3, a cover 46, which is formed into a generally cylindrical shape, is fitted to the rotor shaft 25. The cover 46 is made of a non-magnetic material (stainless steel material in the present embodiment). The cover 46 covers a portion of the outer peripheral surface of the stepped portion 33, a portion of the outer peripheral surface of the intervening member 38, and an entire outer peripheral surface of the magnet arrangement 42. An inner diameter of the cover 46 is slightly larger than an outer diameter of the magnet arrangement 42. Engaging portions 47 are formed in axial ends, respectively, of the cover 46 by extrusion in such a manner that the engaging portions 47 radially inwardly protrude toward inner surfaces of the engaging recesses 40, 41, respectively. Thus, the cover 46 is secured to the rotor shaft 25 to rotate integrally therewith. Each engaging portion 47 extends in the circumferential direction of the cover 46. Furthermore, each engaging portion 47 tightly engages the inner surface of the corresponding engaging recess 40, 41, so that each engaging portion 47 has a generally arcuate cross section, which is generally the same as that of the corresponding engaging recess 40, 41. At the time of forming each engaging portion 47, the entire cover 46 is urged toward the rotor shaft 25 side. Since the outer peripheral surface of the magnet arrangement 42 projects from the opening of the receiving groove 39, the inner peripheral surface of the cover 46 is urged against the outer peripheral surface of the magnet 42.

In the brushless motor 6 constructed in the above described manner, when a drive voltage is supplied from a drive circuit (not shown) to the stator 17 through the power supply device 4, a rotating magnetic filed is generated by the stator 17. Thus, the rotor shaft 25 is rotated.

(Manufacturing Method)

A manufacturing method of the rotor shaft 25 and an assembling method of the rotor 22 will be described.

Figures 7A, 7B:
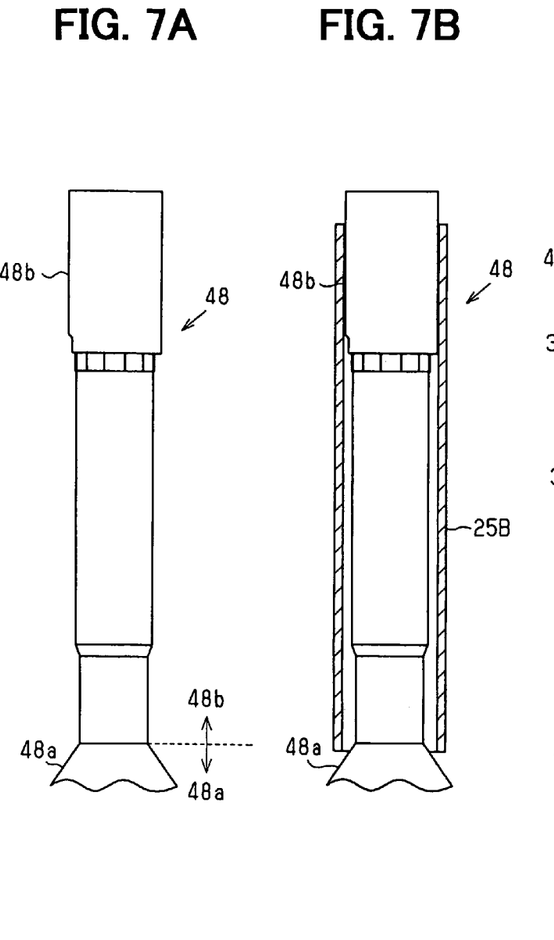
FIG. 7A is a partial side view of a die arrangement according to the embodiment.
FIG. 7B is a descriptive view showing one stage of a manufacturing process of the rotor shaft using the die arrangement shown in FIG. 7A.

First, the rotor shaft 25 is formed using a die arrangement 48 shown in FIG. 7A. The die arrangement 48 includes a stationary die part 48a and a movable die part 48b. The stationary die part 48a and the movable die part 48b are detachable away from each other in the axial direction. The stationary die part 48a is tapered such that an outer diameter of the stationary die part 48a progressively increases from a movable die part 48b side end of the stationary die part 48a in a direction away from the movable die part 48b. The movable die part 48b is formed to have a shape that is substantially the same as that of an inner peripheral part of the rotor shaft 25.

As shown in FIG. 7B, in a state where the stationary die part 48a and the movable die part 48b are fitted together, a cylindrical iron material 25B is inserted over the die arrangement 48 from the movable die part 48b side of the die arrangement 48. The iron material 25B, which is inserted from the movable die part 48b side, engages the tapered surface of the stationary die part 48a and is thus stopped.

Figure 7C:
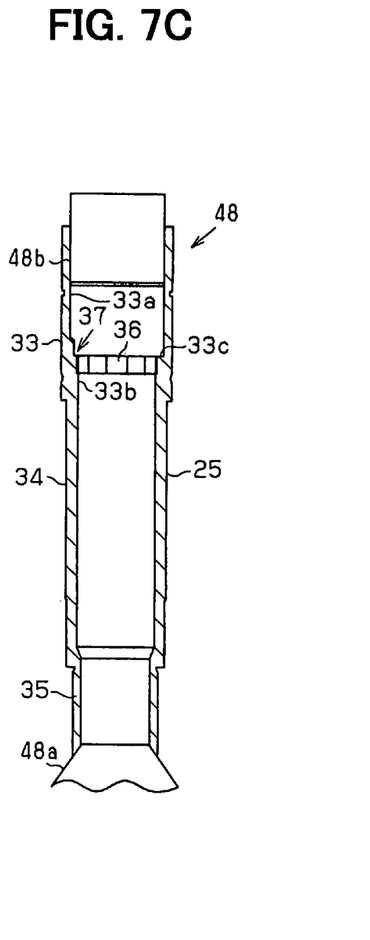
FIG. 7C is a descriptive view showing another stage of the manufacturing process of the rotor shaft.

The iron material 25B, which is axially secured to the die arrangement 48, is forged from an outer peripheral side of the iron material 25B and is pressed against an outer peripheral surface of the die arrangement 48 in plastic working. In this way, the shape of the inner peripheral surface of the rotor shaft 25 is defined, i.e., is formed, and an outer peripheral surface of the iron material 25B is processed by, for example, a lathe turning machine. Thus, the rotor shaft 25 is formed, as shown in FIG. 7C.

When manufacturing of the rotor shaft 25 is completed on the die arrangement 48, the die arrangement 48 is removed from the interior of the rotor shaft 25. First, the movable die part 48b is removed together with the rotor shaft 25 from the stationary die part 48a. Then, the movable die part 48b is moved upwardly, and the rotor shaft 25 is moved downwardly in FIG. 7C. In this way, the rotor shaft 25 is removed from the movable die part 48b.

Thus, in the inner peripheral surface of the rotor shaft 25, the large diameter part 33a of the stepped portion 33, the small diameter part 33b of the stepped portion 33, the inner peripheral surface of the inserting portion 34 and the inner peripheral surface of the resolver securing portion 35 are formed in this order from the side opposite from the stationary die part 48a. Here, the protrusion 37 is also formed simultaneously in the large diameter part 33a, and the positioning portion 36 is also formed simultaneously in the small diameter part 33b. At this time, the inner peripheral surface of the rotor shaft 25 does not form an undercut relative to the movable die part 48b. Thus, the rotor shaft 25 can be removed from the movable die part 48b with the minimum steps.

Figure 8:
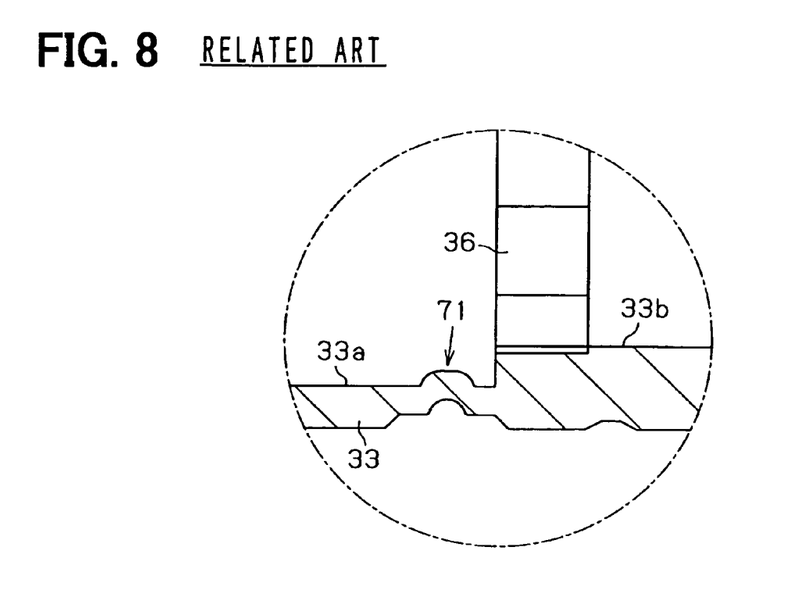
FIG. 8 is a view similar to FIG. 6A, showing a protrusion of a rotor shaft of a comparative example.

In a comparative case where the protrusion 37 is not formed at this time, a protrusion 71 of, for example, FIG. 8 is formed in the large diameter part 33a in an additional manufacturing step. The protrusion 71 can be formed by, for example, punch working, which is performed from the outer peripheral surface of the rotor shaft 25 at a position that corresponds to the protrusion 37 while the rotor shaft 25 is secured by a securing member. However, when an external force, which presses the rotor shaft 25 from the outside of the rotor shaft 25, is applied, for example, in the punch working, a circular shape of the rotor shaft 25, which is produced by the plastic working, could be deformed. When this happens, the nut 30 cannot be installed into the rotor shaft 25. Also, the outer peripheral surface of the inserting portion 34 may be deformed to prevent securing of the magnet arrangement 42 around the inserting portion 34. A restoration process for restoring the circular shape of the rotor shaft 25 cannot be performed due to the presence of the protrusion 71. Contrary to the comparative case, in the present embodiment, the protrusion 37 is simultaneously formed at the time of performing the plastic working of the rotor shaft 25. Thus, the inner peripheral surface or the outer peripheral surface of the rotor shaft 25 can be formed into the circular shape while the protrusion 37 is formed.

An assembling process of the rotor 22 will be described.

First, the rotor shaft 25 is secured to the securing member 100 of FIG. 5. At this time, the rotor shaft 25 is secured by fitting the positioning portion 36 to the fitting portion 101a of the securing member 100.

Then, the components, such as the magnet arrangement 42 and the resolver rotor 44, are installed to the rotor shaft 25. At this time, the rotor shaft 25 is held stationary by the securing member 100. Thus, the installation of the components can be performed in a reliable manner. As a result, the resolver 11 or the like can be easily positioned and installed relative to the rotor shaft 25.

Thereafter, the nut 30 is installed to the inner peripheral surface of the rotor shaft 25. First, in FIG. 2, the nut 30 is press fitted into the rotor shaft 25 through the end opening 25a of the rotor shaft 25, which is located on the stepped portion 33 side of the rotor shaft 25. The nut 30 is engaged with and is stopped by the stop surface 33C, so that the position of the nut 30 is axially fixed. At this time, the recess 30a of the nut 30 is fitted to the protrusion 37, which is formed in the large diameter part 33a of the stepped portion 33. Thus, the nut 30 is circumferentially positioned by the protrusion 37 in the inner peripheral surface of the stepped portion 33 of the rotor shaft 25. As described above, at the time of installing the nut 30 to the rotor shaft 25, the nut 30 can be easily installed to the predetermined position in the inner peripheral surface of the rotor shaft 25. Furthermore, since the recess 30a of the nut 30 is fitted to the protrusion 37, the rotor shaft 25 and the nut 30 are integrally rotatable. For example, even when external forces are applied to the rotor shaft 25 and the nut 30 to rotate the rotor shaft 25 and the nut 30 in opposite directions, respectively, rotation of the nut 30 relative to the rotor shaft 25 is prevented. Furthermore, since the chamfered section 37b is formed in the protrusion 37, the nut 30 can be smoothly press fitted to the stepped portion 33. The screw 31 is installed to the nut 30, which is secured in the rotor shaft 25, through the balls 32, as shown in FIG. 1. In this way, installation of the ball screw mechanism 29 is completed.

Furthermore, with reference to FIG. 2, in the final stage of the assembling operation of the rotor 22, the nut 24 is threadably secured to the steering wheel 3 side end of the rotor shaft 25. At this time, similar to the above installation operation, the nut 24 is secured to the rotor shaft 25 while the rotor shaft 25 is installed to and is secured by the securing member 100. When the nut 24 is tightened against the steering wheel 3 side end of the rotor shaft 25, a rotational torque is applied to the rotor shaft 25. However, the positioning portion 36 of the rotor shaft 25 is fitted to the fitting portion 101a of the securing member 100, so that the rotor shaft 25 can withstand the rotational torque to allow reliable tightening of the nut 24.

The present embodiment provides the following advantages.

(1) In the present embodiment, the positioning portion 36 is formed in the rotor shaft 25, which serves as the cylindrical shaft of the present invention and is formed by the plastic working. Therefore, the securing member 100 can be engaged with the positioning portion 36 to hold the rotor shaft 25 in the predetermined position in the circumferential direction. Thus, the components can be installed to the rotor shaft 25 while the rotor shaft 25 is held in the predetermined position in the circumferential direction. Furthermore, at this time, the positioning portion 36 of the rotor shaft 25 is held by the securing member 100 in such a manner that movement of the positioning portion 36 in the circumferential direction is limited. Thus, the rotor shaft 25 can withstand the rotational torque when the rotational force, which serves as an external force, is applied to the rotor shaft 25. More specifically, the rotor shaft 25 can withstand the rotational torque, which is applied to the rotor shaft 25 when the nut 24 is tightened against the rotor 22. Furthermore, the positioning portion 36 is formed in the inner peripheral surface of the rotor shaft 25. Thus, the rotor shaft 25 is held by the securing member 100 at the inner peripheral surface of the rotor shaft 25, and the components can be installed to the rotor shaft 25 while the outer peripheral surface of the rotor shaft 25 is unobstructed. As a result, at the time of installing the components to the rotor shaft 25, the installation of the components can be facilitated.

Furthermore, the positioning portion 36 can be formed simultaneously at the time of manufacturing the rotor shaft 25 by the plastic working (FIGS. 7A-7C). Thus, the positioning portion 36 can be formed in the rotor shaft 25 in a simple manner without requiring additional manufacturing steps. As a result, the manufacturing costs can be reduced at the time of manufacturing the rotor shaft 25.

(2) In the present embodiment, the cross sectional shape of the receiving hole 36e of the positioning portion 36, which is formed in the rotor shaft 25, is the irregular heptagonal shape. Thus, the positioning portion 36 can be held along the entire outer peripheral surface of the fitting portion 101a of the securing member 100. As a result, in comparison to the case where the rotational force of the rotor shaft 25 is locally received in the circumferential direction, it is possible to withstand a relatively large rotational torque and to stabilize the circumferential balance.

(3) In the present embodiment, the stop surface 33c, which is engaged with the nut 30 to stop the nut 30 in the axial direction, is formed in the inner peripheral surface of the rotor shaft 25. The positioning portion 36 extends from the stop surface 33 on the side opposite from the nut 30. In this way, the wall thickness of the corners of the positioning portion 36 in the stop surface 33c is reduced in the radial direction. Thus, the plastic working can be appropriately performed, and perpendicularity of the stop surface 33c relative to the axial direction can be improved.

(4) According to the present embodiment, in the irregular heptagonal shaped cross section of the receiving hole 36e of the positioning portion 36 of the rotor shaft 25, each section, which connects between the corresponding adjacent linear parts, is formed as the arcuate part. Thus, the wall thickness of the rotor shaft 25 is reduced in each section, which connects between the corresponding adjacent linear parts and is formed as the arcuate part. As a result, the flowability of the material of the positioning portion 36 of the rotor shaft 25 at the time of plastic working is improved, and the perpendicularity of the stop surface 33c relative to the axial direction can be further improved.

(5) In the present embodiment, the protrusion 37 extends from the stop surface 33c on the side where the nut 30 is installed. Thus, the recess 30a of the nut 30 can be fitted to the protrusion 37 to install the nut 30 to the rotor shaft 25. As a result, the nut 30 can be secured at the predetermined position in the rotor shaft 25 by simply inserting the nut 30 into the rotor shaft 25 to facilitate the assembly. Furthermore, the nut 30 can be integrally rotatably secured to the rotor shaft 25, and the rotation of the nut 30 relative to the rotor shaft 25 can be prevented. Furthermore, the protrusion 37 can be simultaneously formed at the time of forming the positioning portion 36 in the rotor shaft 25 by the plastic working. Thus, the rotor shaft 25 can be formed in the simple manner without increasing the number of the manufacturing steps. This allows a reduction in the manufacturing costs. As discussed above, the protrusion 37 can be formed by the plastic working. Thus, the protrusion 37 can be formed without generating a distortion of the inner and outer peripheral surfaces of the rotor shaft 25, which would be otherwise generated by application of external force to the rotor shaft 25 through, for example, the punch working. As a result, it is possible to prevent deterioration of the circularity of the rotor shaft 25.

(6) In the present embodiment, the trapezoidal section 37a of the protrusion 37 is formed to achieve the constant inner radial size between the center axis P of the rotor shaft 25 and the trapezoidal section 37a along the length of the trapezoidal section 37a in the axial direction. Thus, the protrusion 37 does not cause formation of an undercut in the die arrangement 48. As a result, the die arrangement 48, which is used to form the rotor shaft 25, can have a simple structure, and the number of the manufacturing steps can be reduced.

(7) In the present embodiment, the protrusion 37 has the chamfered section 37b. The chamfered section 37b is formed such that the inner radial size between the center axis P of the rotor shaft 25 and the chamfered section 37b progressively decreases toward the positioning portion 36. Thus, the nut 30 can be smoothly fitted into the rotor shaft 25.

(8) According to the present embodiment, in the brushless motor 6, the rotor shaft 25 is used in the rotor 22. Thus, the assembly of the brushless motor 6 can be performed while the rotor shaft 25 is secured in the circumferential direction.

The above embodiment can be modified as follows.

In the above embodiment, the rotor shaft 25, which serves as the cylindrical shaft, is used in the rotor 22 of the brushless motor 6. However, the application of the cylindrical shaft of the present invention is not limited to this. For example, the cylindrical shaft of the present invention can be used in any other applications other than the motors.

In the above embodiment, the brushless motor 6, which serves as the motor of the present invention, is used in the power steering system 1. However, the motor of the present invention can be used in any other systems other than the power steering system 1.

In the above embodiment, the positioning portion 36 axially extends from the stop surface 33c, which is formed in the stepped portion 33, on the resolver securing portion 35 side of the stop surface 33c. However, the position of the positioning portion 36 is not limited to this. That is, the positioning portion 36 can be formed in any axial position in the rotor shaft 25. Furthermore, in the above embodiment, the single positioning portion 36 is provided. However, two or more positioning portions can be formed in the axial direction in the rotor shaft 25. In addition, in such a case where the multiple positioning portions are formed, two external engaging means (i.e., securing members) can be inserted into opposite axial openings, respectively, of the cylindrical shaft.

In the above embodiment, the axial extent of the positioning portion 36 is within the axial extent of the stepped portion 33. However, the axial extent of the positioning portion 36 is not limited to this. For example, the positioning portion 36 can have an axial extent, which extends to the inserting portion 34 or to the inner peripheral surface of the resolver securing portion 35.

In the above embodiment, the cross sectional shape of the receiving hole 36e of the positioning portion 36 is the irregular heptagonal shape. However, the cross sectional shape of the receiving hole 36e of the positioning portion 36 is not limited to this. That is, the cross sectional shape of the receiving hole 36e of the positioning portion 36 can be, for example, a regular polygonal shape or a star shape or can have a curved part as long as the positioning portion 36 can be engaged with the external engaging means (i.e., the securing member) to secure the rotor shaft 25 in the circumferential direction.

In the above embodiment, the positioning portion 36, which has the receiving hole 36e that has the irregular heptagonal cross section, is formed to extend in the axial direction. However, the shape of the positioning portion is not limited to this, and the positioning portion can be extended in a direction other than the axial direction. For example, in the inner peripheral surface of the cylindrical shaft, the positioning portion can be slightly curved relative to the axial direction, and the external engaging means can be inserted along the curve of the positioning portion to engage therewith.

In the above embodiment, the cross sectional shape of the receiving hole 36e of the positioning portion 36 is the irregular heptagonal shape, and five corners of the irregular heptagonal shape is formed as the arcuate corners. However, the cross sectional shape of receiving hole 36e of the positioning portion 36 is not limited to this. For example, all of the corners can be formed as arcuate corners or can be formed as obtuse corners.

In the above embodiment, the protrusion 37 includes the trapezoidal section 37a and the chamfered section 37b. However, the shape of the protrusion 37 is not limited to this. For example, the protrusion 37 can be formed only by the trapezoidal section 37a or can be formed only by the chamfered section 37b.

Figure 9:
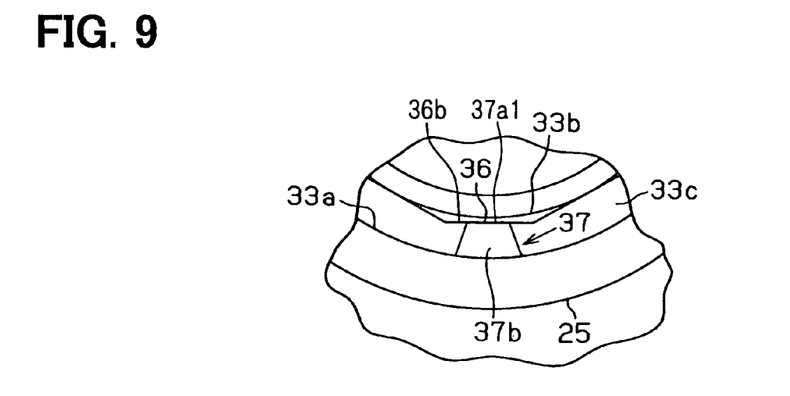
FIG. 9 is a partial end view similar to FIG. 6C, showing a modification of the rotor shaft.

In the above embodiment, the inner radial size between the center axis P of the rotor shaft 25 and the trapezoidal section 37a is greater than the distance r2, which is the inner radial size between the center axis P of the rotor shaft 25 and the linear part 36b of the positioning portion 36 that is adjacent to the trapezoidal section 37a in the axial direction. However, the inner radial size between the center axis P of the rotor shaft 25 and the trapezoidal section 37a can be generally the same as the distance r2. In other words, as shown in FIG. 9, a radial position of the radially innermost top surface 37a1 of the protrusion 37 can be generally the same as a radial position of the linear part 36b of the cross section of the receiving hole 36e of the positioning portion 36. In this way, a step between the protrusion 37 and the positioning portion 36 can be minimized or eliminated, as shown in FIG. 9, and the flowablility of the material at this region can be improved. As a result, it is possible to provide the rotor shaft 25, which has an improved dimensional precision at this region where the positioning portion 36 and the protrusion 37 are connected together.

It is desirable that the trapezoidal section 37a, which is the highest part of the protrusion, is positioned in one of the linear parts 36a, 36b of the positioning portion 36, which are formed as thick wall portions. In this case, the trapezoidal section 37a desirably provides the inner radial size between the center axis P of the rotor shaft 25 and the trapezoidal section 37a in such a manner that the inner radial size is generally the same as the distance r1 or r2 between the center axis P of the rotor shaft 25 and the one of the linear parts 36a, 36b of the positioning portion 36. In this way, the step between the positioning portion 36 and the protrusion 37 can be minimized to further improve the dimensional precision at this region where the positioning portion 36 and the protrusion 37 are connected together.

In the above embodiment, the single protrusion 37 is formed in the inner peripheral part of the rotor shaft 25. Alternatively, a plurality of protrusions can be arranged in the circumferential direction, and the same number of corresponding recesses, which is the same as the number of the protrusions, can be formed in the nut 30. In this way, the nut 30 and the rotor shaft 25 can be more effectively secured to one another.

In the above embodiment, the nut 30 is formed as the insert member, which is engaged with and is stopped by the rotor shaft 25. However, the insert member is not limited to the nut 30. The insert member can be any other member, which is secured in the rotor shaft 25.

Additional advantages and modifications will readily occur to those skilled in the art. The invention in its broader terms is therefore not limited to the specific details, representative apparatus, and illustrative examples shown and described.

What is claimed is:

1. A rotor comprising:
   a cylindrical shaft that is formed through plastic working; and
   an insert member that is fitted into the cylindrical shaft in an axial direction of the cylindrical shaft, wherein:
   the cylindrical shaft includes a positioning portion that is formed in an inner peripheral surface of the cylindrical shaft by the plastic working of the cylindrical shaft;
   the positioning portion is detachably engageable with an external engaging means, which is insertable into the cylindrical shaft in the axial direction of the cylindrical shaft to position the cylindrical shaft in a circumferential direction;
   when the positioning portion is engaged with the external engaging means, relative rotation between the cylindrical shaft and the external engaging means is limited;
   the positioning portion defines a receiving hole therein for receiving the external engaging means;
   the cylindrical shaft further includes:
      an engaging surface, which is formed integrally in the inner peripheral surface of the cylinder shaft by the plastic working of the cylinder shaft and which radially contacts the insert member and the external engaging means; and
      a stop surface, which is formed integrally in the inner peripheral surface of the cylindrical shaft by the plastic working of the cylindrical shaft and which axially engages the insert member;
   the stop surface stops further insertion of the insert member in the axial direction of the cylindrical shaft;
   the positioning portion extends from the stop surface away from the insert member in the axial direction of the cylindrical shaft; and
   an outer peripheral surface of the cylindrical shaft is directly supported by at least one bearing.

2. The rotor according to claim 1, wherein the receiving hole has a polygonal cross section, which includes a plurality of linear parts.

3. The rotor according to claim 2, wherein the polygonal cross section of the receiving hole of the positioning portion further includes at least one arcuate part, each of which is located between corresponding two of the plurality of linear parts of the polygonal cross section of the receiving hole and extends along a corresponding imaginary arc that has a predetermined radius of curvature.

4. The rotor according to claim 1, wherein the receiving hole has an asymmetrically shaped cross section, which includes at least one arcuate part.

5. The rotor according to claim 4, wherein;
   each of the at least one arcuate part of the asymmetrically shaped cross section of the receiving hole is located in a corresponding thin wall portion of the positioning portion, which has a radial wall thickness smaller than that of at least another part of the positioning portion; and
   the positioning portion extends from the stop surface away from the insert member in the axial direction of the cylindrical shaft.

6. A rotor comprising:
   a cylindrical shaft that is formed through plastic working; and
   an insert member that is fitted into the cylindrical shaft in an axial direction of the cylindrical shaft, wherein:
   the cylindrical shaft includes a positioning portion that is formed in an inner peripheral surface of the cylindrical shaft by the plastic working of the cylindrical shaft;
   the positioning portion is detachably engageable with an external engaging means, which is insertable into the cylindrical shaft in the axial direction of the cylindrical shaft to position the cylindrical shaft in a circumferential direction;
   when the positioning portion is engaged with the external engaging means, relative rotation between the cylindrical shaft and the external engaging means is limited;
   the positioning portion defines a receiving hole therein for receiving the external engaging means;
   the receiving hole has a polygonal cross section, which includes a plurality of linear parts;
   the cylindrical shaft further includes a stop surface, which is formed in the inner peripheral surface of the cylindrical shaft by the plastic working of the cylindrical shaft and which engages the insert member;
   the stop surface stops further insertion of the insert member in the axial direction of the cylindrical shaft;
   the positioning portion extends from the stop surface away from the insert member in the axial direction of the cylindrical shaft;
   the cylindrical shaft further includes a protrusion that is formed in the inner peripheral surface of the cylindrical shaft by the plastic working of the cylindrical shaft;
   the protrusion engages the insert member and thereby limits relative rotation between the cylindrical shaft and the insert member; and
   the protrusion protrudes in a radial direction of the cylindrical shaft and extends from the stop surface toward the insert member in the axial direction of the cylindrical shaft.

7. The rotor according to claim 6, wherein a radially innermost top surface of the protrusion extends parallel to the axial direction of the cylindrical shaft.

8. The rotor according to claim 6, wherein a radial position of a radially innermost point of the protrusion is generally the same as a radial position of a radially innermost point of an axially opposed section of the positioning portion, which is opposed to the protrusion in the axial direction of the cylindrical shaft.

9. The rotor according to claim 6, wherein the protrusion has a chamfered section, which is tapered away from the stop surface in the axial direction of the cylindrical shaft.

10. The rotor according to claim 6, further comprising at least one magnet that is installed to the cylindrical shaft, wherein:
the cylindrical shaft further includes a receiving groove, which is formed in an outer peripheral surface of the cylindrical shaft; and
the at least one magnet is held in the receiving groove.

11. The rotor according to claim 10, further comprising a cover that is positioned radially outward of the at least one magnet and covers the at least one magnet.

12. The rotor according to claim 10, wherein:
the positioning portion defines a receiving hole therein for receiving the external engaging means;
the receiving hole has a polygonal cross section; and
the polygonal cross section of the receiving hole includes:
a plurality of linear parts; and
at least one arcuate part, each of which is located between corresponding two of the plurality of linear parts and extends along a corresponding imaginary arc that has a predetermined radius of curvature.

13. The rotor according to claim 10, wherein:
the rotor is for a motor of a power steering system, wherein the power steering system includes a ball screw mechanism;
the rotor is further characterized by a nut of the ball screw mechanism, which is fitted into the cylindrical shaft in the axial direction of the cylindrical shaft;
the cylindrical shaft further includes a stop surface, which is formed in the inner peripheral surface of the cylindrical shaft by the plastic working of the cylindrical shaft and which engages the nut;
the stop surface stops further insertion of the nut in the axial direction of the cylindrical shaft; and
the positioning portion extends from the stop surface away from the nut in the axial direction of the cylindrical shaft.

14. A motor comprising a rotor according to claim 6.

15. A rotor comprising:
a cylindrical shaft that is formed through plastic working; and
an insert member that is fitted into the cylindrical shaft in an axial direction of the cylindrical shaft, wherein:
the cylindrical shaft includes a positioning portion that is formed in an inner peripheral surface of the cylindrical shaft by the plastic working of the cylindrical shaft;
the positioning portion is detachably engageable with an external engaging means, which is insertable into the cylindrical shaft in the axial direction of the cylindrical shaft to position the cylindrical shaft in a circumferential direction; and
when the positioning portion is engaged with the external engaging means, relative rotation between the cylindrical shaft and the external engaging means is limited;
the Positioning portion defines a receiving hole therein for receiving the external engaging means;
the receiving hole has a polygonal cross section, which includes a plurality of linear parts;
the cylindrical shaft further includes a stop surface, which is formed in the inner peripheral surface of the cylindrical shaft by the plastic working of the cylindrical shaft and which engages the insert member;
the stop surface stops further insertion of the insert member in the axial direction of the cylindrical shaft;
the positioning portion extends from the stop surface away from the insert member in the axial direction of the cylindrical shaft;
the cylindrical shaft further includes a protrusion that is formed in the inner peripheral surface of the cylindrical shaft by the plastic working of the cylindrical shaft;
the protrusion engages the insert member and thereby limits relative rotation between the cylindrical shaft and the insert member;
the protrusion protrudes in a radial direction of the cylindrical shaft and extends from the stop surface toward the insert member in the axial direction of the cylindrical shaft;
a radially innermost top surface of the protrusion extends parallel to the axial direction of the cylindrical shaft; and
a radial position of the radially innermost top surface of the protrusion is generally the same as a radial position of axially opposed one of the plurality of linear parts of the polygonal cross section of the receiving hole of the positioning portion, which is opposed to the protrusion in the axial direction of the cylindrical shaft.

16. A rotor comprising:
a cylindrical shaft that is formed through plastic working; and
an insert member that is fitted into a cylindrical shaft in the axial direction of the cylindrical shaft, wherein:
the cylindrical shaft includes a positioning portion that is formed in an inner peripheral surface of the cylindrical shaft by the plastic working of the cylindrical shaft;
the positioning portion is detachably engageable with an external engaging means, which is insertable into the cylindrical shaft in the axial direction of the cylindrical shaft to position the cylindrical shaft in a circumferential direction;
when the positioning portion is engaged with the external engaging means, relative rotation between the cylindrical shaft and the external engaging means is limited;
the positioning portion defines a receiving hole therein for receiving the external engaging means;
the receiving hole has an asymmetrically shaped cross section, which includes at least one arcuate part;
the cylindrical shaft further includes a stop surface, which is formed in the inner peripheral surface of the cylindrical shaft by the plastic working of the cylindrical shaft and engages an insert member;
the stop surface stops further insertion of the insert member in the axial direction of the cylindrical shaft;
each of the at least one arcuate part of the asymmetrically shared cross section of the receiving hole is located in a corresponding thin wall portion of the positioning portion, which has a radial wall thickness smaller than that of at least another part of the positioning portion;
the positioning portion extends from the stop surface away from the insert member in the axial direction of the cylindrical shaft;
the cylindrical shaft further includes a protrusion that is formed in the inner peripheral surface of the cylindrical shaft by the plastic working of the cylindrical shaft to engage with the insert member and thereby to limit relative rotation between the cylindrical shaft and the insert member;

the protrusion protrudes in a radial direction of the cylindrical shaft and extends from the stop surface toward the insert member in the axial direction of the cylindrical shaft;

a radially innermost top surface of the protrusion extends parallel to the axial direction of the cylindrical shaft; and a radial position of the radially innermost top surface of the protrusion is generally the same as a radial position of a radially innermost point of an axially opposed thick wall portion of the positioning portion, which is opposed to the protrusion in the axial direction of the cylindrical shaft and which has a radial wall thickness greater than that of at least another part of the positioning portion.

17. A rotor comprising:

a cylindrical shaft that is formed through plastic working;

at least one magnet that is installed to the cylindrical shaft;

a cover that is positioned radially outward of the at least one magnet and covers the at least one magnet; and an intervening member, which is positioned adjacent to the at least one magnet on one axial side of the at least one magnet, wherein:

the cylindrical shaft includes a positioning portion that is formed in an inner peripheral surface of the cylindrical shaft by the plastic working of the cylindrical shaft;

the positioning portion is detachably engageable with an external engaging means, which is insertable into the cylindrical shaft in an axial direction of the cylindrical shaft to position the cylindrical shaft in a circumferential direction; and when the positioning portion is engaged with the external engaging means, relative rotation between the cylindrical shaft and the external engaging means is limited;

the cylindrical shaft further includes a receiving groove, which is formed in an outer peripheral surface of the cylindrical shaft;

the at least one magnet is held in the receiving groove;

the intervening member includes an engaging recess, which is recessed in an outer peripheral surface of the intervening member;

the cylindrical shaft further includes an engaging recess, which is recessed in the outer peripheral surface of the cylindrical shaft on the other axial side of the at least one magnet; and the cover includes two engaging portions, which protrude radially inwardly and are fitted into the engaging recess of the intervening member and the engaging recess of the cylindrical shaft, respectively, to limit axial movement of the cover.

18. A rotor comprising a cylindrical shaft that is formed through plastic working, wherein:

the cylindrical shaft includes a positioning portion that is formed in an inner peripheral surface of the cylindrical shaft by the plastic working of the cylindrical shaft;

the positioning portion is detachably engageable with an external engaging means, which is insertable into the cylindrical shaft in an axial direction of the cylindrical shaft to position the cylindrical shaft in a circumferential direction; and when the positioning portion is engaged with the external engaging means, relative rotation between the cylindrical shaft and the external engaging means is limited;

the rotor is for a motor of a power steering system, wherein the power steering system includes a ball screw mechanism;

the rotor further includes a nut of the ball screw mechanism, which is fitted into the cylindrical shaft in the axial direction of the cylindrical shaft; and the cylindrical shaft further includes:

a stop surface, which is formed in the inner peripheral surface of the cylindrical shaft by the plastic working of the cylindrical shaft and which engages the nut, wherein the stop surface stops further insertion of the nut in the axial direction of the cylindrical shaft, and the positioning portion extends from the stop surface away from the nut in the axial direction of the cylindrical shaft; and a protrusion, which is formed in the inner peripheral surface of the cylindrical shaft by the plastic working of the cylindrical shaft, wherein the protrusion protrudes in a radial direction of the cylindrical shaft and extends from the stop surface toward the nut in the axial direction of the cylindrical shaft, and the protrusion engages the nut and thereby limits relative rotation between the cylindrical shaft and the nut.

19. The rotor according to claim 18, wherein:

the positioning portion defines a receiving hole therein for receiving the external engaging means;

the receiving hole has a polygonal cross section; and the polygonal cross section of the receiving hole includes:

a plurality of linear parts; and at least one arcuate part, each of which is located between corresponding two of the plurality of linear parts and extends along a corresponding imaginary arc that has a predetermined radius of curvature.

* * * * *